United States Patent [19]

Rummel

[11] Patent Number: 4,608,834
[45] Date of Patent: Sep. 2, 1986

[54] AIR-CONDITIONING SYSTEM FOR VEHICLES

[75] Inventor: Wolfram Rummel, Muenchen, Fed. Rep. of Germany

[73] Assignee: Webasto-Werk W. Baier GmbH & Co., Fed. Rep. of Germany

[21] Appl. No.: 716,284

[22] Filed: Mar. 26, 1985

[30] Foreign Application Priority Data

Mar. 26, 1984 [DE] Fed. Rep. of Germany ....... 3411053

[51] Int. Cl.$^4$ .............................................. B60H 1/32
[52] U.S. Cl. ............................. 62/244; 62/DIG. 16; 98/2.11; 98/2.14
[58] Field of Search ................. 62/244, 239, DIG. 16; 98/2.14, 2.11

[56] References Cited

U.S. PATENT DOCUMENTS

| 1,983,979 | 12/1934 | Graham | 98/2.14 |
| 2,172,939 | 9/1939 | Lintern et al. | 98/2.14 |
| 2,500,527 | 3/1950 | Demuth | 62/239 X |
| 3,555,846 | 1/1971 | Harbeck et al. | 62/244 |
| 3,978,174 | 8/1976 | Peer | 98/2.14 X |
| 4,048,910 | 9/1977 | Weir | 98/2.11 X |
| 4,048,911 | 9/1977 | Petersen | 98/2.14 |
| 4,098,093 | 7/1978 | Czyl | 62/244 X |
| 4,217,764 | 8/1980 | Armbruster | 62/239 X |
| 4,281,522 | 8/1981 | Bussjager | 62/DIG. 16 |

Primary Examiner—William E. Tapolcai
Attorney, Agent, or Firm—Sixbey, Friedman & Leedom

[57] ABSTRACT

An air-conditioning system for vehicles, that can be retrofit installed into a roof ventilation opening, a roof ventilation assembly, with an extremely low overall height above the roof of the vehicle, as a substitute for a hatch of the ventilation assembly provided for the closing and opening of the roof ventilation opening. The system has a receiving part that can be attached instead of the hatch without modification to the roof opening or hinge assembly for the hatch. The receiving part has a circulating-air intake device that is separated from the delivery side of a blower that is disposed in a recessed central area of the receiving part that can be inserted through the roof opening to below the level of the roof. The air-conditioning system, as a whole, by means of the hinge assembly of the ventilation system, can be moved in such a way that, also, a direct ventilation via the roof opening is possible.

22 Claims, 6 Drawing Figures

AIR-CONDITIONING SYSTEM FOR VEHICLES

BACKGROUND AND SUMMARY OF THE INVENTION

This invention relates to an air-conditioning system for vehicles, especially utility vehicles, having a roof opening in the area of the driver's cab for ventilation purposes.

German Offenlegungsschrift No. 33 18 708 of the assignee of the present application describes an air-conditioning unit that is to be mounted on the roof of utility vehicles, completely over the roof of the vehicle, in a compact construction, with a favorable ratio of cooling capacity to volume and weight. This air-conditioning unit comprises a condenser part having a condenser and a condenser blower and an evaporator part that is separated transversely from the condenser part, said evaporator part having an upright evaporator and a blower assigned to said evaporator. Via an opening in the roof sheeting and in the bottom side of the air-conditioning unit, circulating air is sucked from the interior of the cab and, after it has passed through the evaporator, by means of the blower, via its delivery side, is returned into the interior of the cab as cooled air. The blower assigned to the evaporator has a horizontal axis and the blower is preferably a double radial fan.

An air-conditioning unit that is to be mounted on the roof in this manner has a relatively high dead weight which leads to difficulties especially in the case of tilting cabs. The overall height of the unit above the roof sheeting of the vehicle is also relatively large because the dimensions, especially of the condenser and the evaporator, cannot be reduced if the necessary capacity of the air conditioner unit is to be achieved. When the vehicle has a spoiler that is mounted on the roof, the operation of this type of air-conditioning unit also presents problems since, as a result of the dynamic pressure support, a sufficient aeration of the condenser becomes almost impossible. When a roof opening is also provided in the cab area of the vehicle for ventilation purposes (such as the type that may be opened and closed by means of a hatch that is movable via a hinge mechanism; see, e.g., U.S. Pat. No. 4,415,197), this ventilating device must be removed when an air-conditioning unit is installed on top of the roof so that fresh air can no longer be supplied via the roof opening.

On the basis of German Offenlegungsschrift No. 21 05 296 and corresponding U.S. Pat. No. 3,670,808, an air-conditioning unit is known that is also intended for roof mounting, where a condenser and an evaporator are arranged behind one another (relative to a forward driving direction) in compartments that are separated from one another by a transversely extending wall. This results in an overall length of the air-conditioning unit that is unsuitable for the longitudinal dimensions of truck cabs. Even in the case of an inclined arrangement of the condenser, which is known on the basis of German Offenlegungsschrift No. 27 57 415, and corresponding U.S. Pat. No. 4,134,275, the overall length of the air-conditioning unit is too long for cabs of utility vehicles.

The invention aims, while overcoming the above-mentioned difficulties, to provide an air-conditioning system for vehicles, especially utility vehicles of the initially mentioned type, that is light in weight, that can be mounted as an add-on unit retrofit to vehicles, even those having a roof mounted spoiler, that works reliably, and that can be manufactured cost-effectively. In addition, it is also an object to maintain the ability to conventionally ventilate the cab through the roof opening. The invention also seeks a design that enables ventilation, air-conditioning with different capacity levels and a circulating/fresh-air supply of 0 to 100% to be made possible in different operational modes.

In accordance with preferred embodiments of the air-conditioning unit according to the invention, a tiltable hatch of an existing roof ventilation opening is removed and replaced by a receiving part that may possibly be moved by means of the existing hinge mechanisms provided for opening and closing of the roof opening hatch. By means of this mobility of the receiving part, fresh air can be supplied directly via the roof opening. This receiving part carries a blower, at the delivery side of which an air diffuser is arranged via which, in the condition of the receiving part that closes the roof opening, air can be directed into the interior to the cab as circulating air and drawn out of the interior of the cab via a circulating-air intake device that is closed off with respect to the delivery side of the blower. This permits a ventilation of the interior of the cab even when the roof opening is closed so that, even in the case of unfavorable weather conditions, such as rain, show, etc., sufficient air is supplied to the driver's cab.

The receiving part can be mounted easily because any existing hinge mechanism for the hatch of the roof ventilation opening can be used in an unchanged condition for the receiving part. Since, according to the invention, the blower is arranged approximately in the center area of the receiving part with a horizontally aligned axis, the overall height of the air-conditioning system above the vehicle roof is also relatively low. Since, in addition, the already existing roof ventilation opening in the driver's cab area can be utilized for an air-conditioning system, all installation work for the cutting of an opening into the roof sheeting of a vehicle is eliminated. The receiving part, as such, is easy to manufacture and has a relatively low dead weight even when the blower and air diffuser are provided. As a result of this low overall height of the air-conditioning system, no difficulties are encountered when installing the unit into vehicles having a spoiler that is mounted on the roof, because aeration of a condenser that is supported by dynamic pressure is not required.

In order to further reduce the height of the superstructure above the roof, of the air-conditioning system according to the invention, the receiving part has a lower center area in which the blower and the air diffuser are provided. In order to design the receiving part to fit all common sizes of roof openings, this lower center area of the receiving part has smaller dimensions than the smallest customary roof opening. In the case of such a further feature of the air-conditioning unit, the blower is partially and the air diffuser and the circulating-air intake device are completely lowered through the roof opening, so as to protrude into the interior of the cab.

The receiving part of the air-conditioning system, advantageously, is developed somewhat in keel-hulled boat shape with sides that extend upwardly beyond the blower and have upper edges that form a flat surface which receives a closure part, whereby its central area is recessed and has a trapezoidal cross-section.

In order to, irrespective of the position of the receiving part, permit a supply of fresh air and possibly also a mixing of fresh air with air-conditioned air of the air-conditioning system, a fresh-air inlet device is provided at the side of the receiving part pointing in the forward driving direction, the fresh-air supply preferably being controllable by means of a flap.

In order to ensure an even diffusion of air in the interior of the driver's cab, an air diffuser is provided that includes an air diffusion duct with several air outlet nozzles whose positions are preferably adjustable. In order to obtain a construction that is as compact as possible, a preferably vertical separating wall is provided for separating the delivery side of the blower from the circulating-air intake device, said said separating wall, at the same time, forming a limiting wall of the air diffusion duct.

In accordance with another aspect of the invention, the lower center area of the receiving part has a trapezoidal cross-section, the shorter of the parallel sides of which faces the interior of the cab. The result is that the portion of the receiving part that protrudes into the interior of the cabin is dimensioned to be as narrow as possible and, therefore, the height of the interior space is shortened only slightly and is shortened, mainly, at a point where the driver is not affected by the presence of the receiving part, particularly with respect to headroom.

According to a first of alternative embodiments of the air-conditioning system according to the invention, the top side of the receiving part is closed by means of a closure part in the form of a covering cap which is, preferably, detachably connected with the receiving part in order to provide easy and rapid access to the aggregates in the receiving part.

According to another embodiment the receiving part forms a bottom part of a housing on which an inverted trough-shaped top part is mounted to form a receiving space of sufficient size for at least one evaporator. In this way, an evaporator can, without difficulties, be mounted above the roof of the vehicle, in a manner saving space and retaining a compact overall height. As part of the air-conditioning system, the evaporator, via coolant pipes, is connected with the aggregates of the air-conditioning system, such as a condenser part and similar parts.

In the case of this alternative embodiment of the invention, the air-conditioning system not only permits the conventional direct supplying of fresh air to the interior of the driver's cab through the roof opening by movement of the receiving part, as a whole, via the existing hinge mechanism, but also enables a supplying of air-conditioned air by means of the evaporator in the upper part of the housing. Also possible is the supplying of fresh air via the fresh-air inlet device of the air-conditioning system according to the invention, so that fresh air can be mixed with the cooled circulating air. As a result, a large number of methods of operation of the air-conditioning system according to the invention is made possible with an arrangement having very small dimensions and without concern for whether a spoiler might possibly be mounted on the roof.

Various arrangements of evaporators are possible with the air-conditioning system according to the invention. The arrangement of the evaporator can take place in such a way that, according to the desired capacity requirement of the system, evaporators of different sizes and designs can be installed without a significant change of the air-conditioning system with respect to the structure. Thus the capacity can be adapted, according to the area of usage and size of the cab, to the user's requirements.

Advantageously, the bottom part of the housing and the closure part of the housing are detachably connected with one another so that the aggregates of the system are easily accessible for maintenance and repair purposes.

Additionally, a water drip for the carrying-off of condensation water produced at the evaporators is provided in the bottom part of the housing above the roof sheeting, as well as connections for the coolant pipes by means of which a connection is established, especially to the condenser and possibly also to a collecting dryer. The condenser with other aggregates can be mounted to the vehicle at any suitable point, such as the underfloor, in front of the radiator, at the wheel housing, at the frame, or a similar point, in such a way that, if possible, no housing is required for it. The condenser can then be mounted at a point where an optimal ventilation of said condenser is possible.

Advantageously, sealing means are provided at the bottom side of the receiving part or the bottom part of the housing which, in the position of the receiving part that closes the roof opening, interact with the roof sheeting in order to ensure a tight sealing therebetween. Conventionally profiled sealing or strips or similar means may be used for this purpose.

In the embodiment of the invention, the receiving part with the blower is designed to be such that it will fit into the smallest conventional roof opening yet, if necessary, in the case of a larger roof opening the same receiving part can be used without change. In addition, the bottom part of the housing and the top part of the housing are constructed to be such that the relationships of the weights and sizes of the evaporator, the blower and the housing permit an unchanged functioning of the roof opening with respect to the interior of the driver's cab. Since the air-conditioning system according to the invention, on the whole, is much lighter than previous air-conditioning units and systems, this air-conditioning system is also very suitable for tilting cabs. The height above the roof of the vehicle of the air-conditioning system is approximately maximally 100 to 120 mm when the air-conditioning system is equipped with an evaporator. Preferably, the cooling capacity, depending on the evaporator used, is approximately between 3,500 and 6,000 kcal/h.

These and further objects, features and advantages of the present invention will become more obvious from the following description when taken in connection with the accompanying drawings which show, for purposes of illustration only, plural embodiments in accordance with the present invention.

DETAILED DESCRIPTION OF THE PREFERRED EMBODIMENTS

For purposes of this invention, the term "air-conditioning system" is used in its broadest sense to mean a system for treatment of air in any manner, not only heating, cooling and dehumidifying, but also filtering, recirculating, admixing with outside air, or any combination of such treatments.

Figure 1:
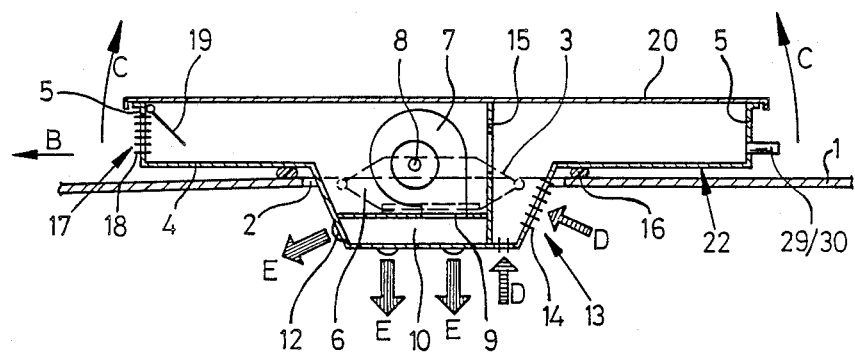
FIG. 1 is a lateral sectional view of an embodiment of an air-conditioning system for vehicles.
Figure 2:
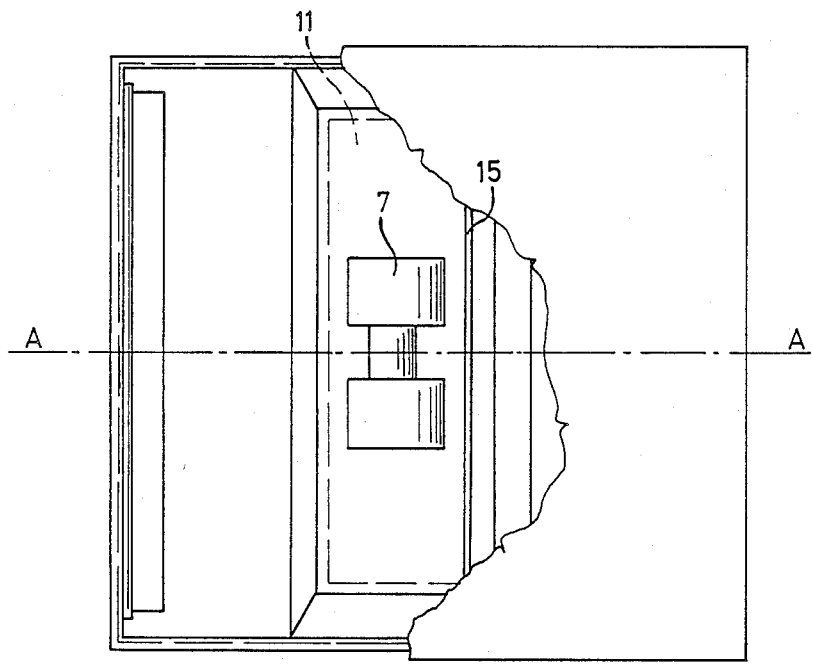
FIG. 2 is a top view of the air-conditioning system of FIG. 1, where a covering cap is partially cut out.

In the case of the embodiment of the air-conditioning system according to FIG. 1 and 2, the roof sheeting of the driver's cab of a vehicle, such as a utility vehicle, including buses, trucks and construction or agricultural equipment, has the reference number 1. In this roof sheeting 1, a roof opening 2 is provided which is manufactured for a ventilating system (such as that of U.S. Pat. No. 4,415,197) in the vehicle manufacturing plant and with which a hatch (that is not shown) is associated that by means of a hinge mechanism (which is schematically depicted in broken lines and has the number 3) can be moved in order to introduce fresh air into the interior in FIG. 1 and more fully in FIG. 6 of the cab via the roof opening 2.

While the present invention is not limited to use with hinge mechanisms and ventilating systems of the type shown in the noted patent, to the extent that it is necessary to a complete understanding of this invention, the disclosure of this patent is incorporated by reference.

The air-conditioning system of the present invention is designed as an add-on unit that can be retrofit in place of the hatch of a ventilation system without modification of its hinge assembly or the roof opening. The illustrated air conditioning system has a receiving part 4, which, instead of the conventional hatch, is connected with the hinge mechanism 3 so that it can, therefore, be moved by the hinge mechanism in the same manner as the hatch was. To this end, the receiving part 4 need only be provided with a connecting means (such as a pair of brackets) of the same type found on the hatch and at a corresponding location so that the ends of the hinge mechanism, e.g., support arms pivotally connected to brackets at the roof opening, can be pivotally attached thereto in the same manner that the hinge mechanism was attached to connecting means of the hatch. As shown, the receiving part 4 is developed somewhat in the shape of a keel-hulled boat and has sides 5 which have flanged edges at the top of the receiving part 4. The bottom wall of receiving part 4 is recessed in its central area, and this recessed central area 6 (forming the keel of the boat-shape) has a trapezoidal cross-section. The recessed central area 6 has such dimensions that it will fit through the smallest conventional roof opening 2 (while the dimensions of opening 2 will vary depending on whether the vehicle is a bus, truck or the like, the smallest opening would be about 20 cm in the lengthwise direction of the vehicle and about 30 cm widthwise thereof) so as to protrude into the interior of the driver's cab.

A blower 7 is housed in the recessed central area 6 of the receiving part 4, the shaft 8 of said blower 7 being approximately horizontal. As shown in FIG. 2, this blower 7 is preferably a double radial flow blower. Connected to the delivery side of said blower 7, is an air diffuser 10 which, as shown in FIG. 2, has an air diffusion duct 11 extending transversely to the longitudinal axis A—A of the vehicle (FIG. 2).

As shown diagrammatically in FIG. 1, several air outlet nozzles 13 are associated with the air diffusion duct 11, via which, as shown by arrows E, air enters into the interior of the driver's cab, the air outlet nozzles 12 having the purpose of directing the air flow as desired. The air outlet nozzles may also be designed in such a way that the discharge of air into the interior of the driver's cab can be blocked. By means of this air diffuser 10, an even distribution of air is permitted in the interior of the driver's cab and by means of the air outlet nozzles, the airflow can preferably also be directed to specifically desired points.

On one of the sloping sides of the recessed central area 6, a circulating-air intake device 13 is provided that is equipped with an intake grid 14. In order to separate the delivery side 9 of the blower 7 from the circulating-air intake device 13, an approximately vertical separating wall 15 is provided which, as shown in FIG. 2, extends transversely relative to the longitudinal axis A—A of the vehicle and extends upward slightly beyond the sides 5 of the receiving part 4. However, an aperture 15a is provided in wall 15 in order to communicate intake device 15 with the intake side of blower 7.

As shown especially in FIG. 1, the blower 7 has its delivery side 9 lowered below the level of the roof sheeting 1 within the roof opening 2. Likewise, the air diffuser 10 and the circulating-air intake device 13 together are lowered through the roof opening 2. At the bottom side of the receiving part 4, sealing means 16 are provided upon which receiving part 4 rests on the roof sheeting 1 and thus, by means of an interaction with the roof sheeting, ensures a reliable tight sealing between the receiving part and the roof sheeting.

FIG. 1 also shows that a fresh-air inlet device 17 is provided, namely on the side of the receiving part 4 that points in the forward driving direction B. This fresh-air inlet device 17 is equipped with a fresh-air intake grid 18. A flap 19 is provided for controlling the amount of fresh air, entering via the fresh-air inlet device 17, that will be deliver the air diffuser 10, by means of the blower 7.

In the embodiment according to FIGS. 1 and 2, the sides 5 of the boat-shaped receiving part 4 extend upwardly to an extent that they are slightly higher than the top of the blower 7, and the top of receiving part 4 of the air-conditioning system is closed-off by way of a closure part in the form of a covering cap 20 that, advantageously, is detachably connected upon the flanges of side walls 5 of the receiving part 4. As a result, easy access is made possible from the outside for repair and maintenance purposes. In this case, the covering cap 20 must only be detached from the receiving part 4. Furthermore, since separating wall 15 is only slightly higher than side walls 15, a tightly sealed juncture between cap 20 and wall 15 can be ensured without affecting the seal between side walls 5 and covering cap 20.

As shown, in the case of the embodiment illustrated in FIGS. 1 and 2, an air-conditioning system is possible that is light in weight and that, for purposes of retrofitting, can be installed without difficulties instead of the hatch that otherwise exists for a roof ventilating opening 2, in which case, the receiving part 4 with the fitted covering cap 20 and the aggregates and devices disposed therein can be moved, as a whole, by means of the existing hinge mechanism 3 in order to permit a direct supplying of fresh air into the driver's cab via the roof opening 2 by swinging of the air-conditioning system into a position corresponding to a raised hatch position.

The overall height of applicant's system above the roof, in comparison to the conventional air-conditioning units that can be mounted on the roof, is much lower because the recessed central area 6 of the receiving part 4 protrudes into the interior of the driver's cab through the roof opening 2. Also, in the case of the air-conditioning system according to the invention, no additional opening in the roof sheeting 1 has to be provided because the already existing roof opening 2 is utilized for the installation of the air-conditioning system.

Figure 3:
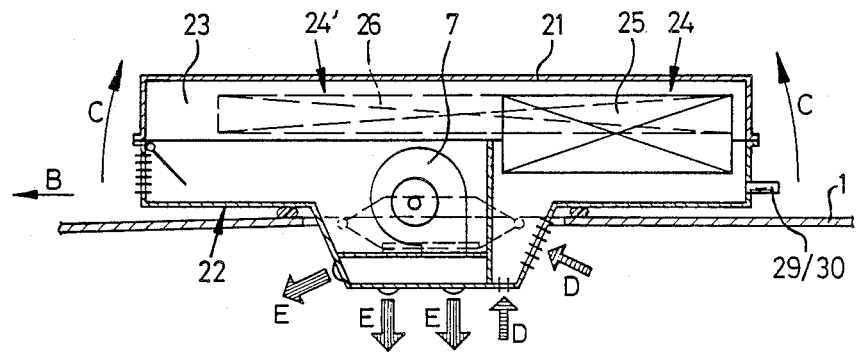
FIG. 3 is a lateral sectional view of another embodiment of an air-conditioning system.
Figure 4:
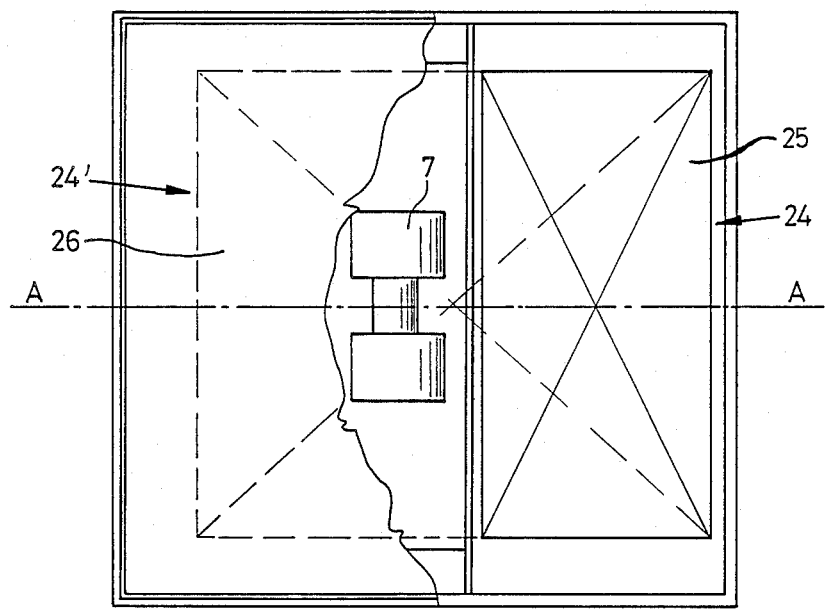
FIG. 4 is a top view of the air-conditioning system of FIG. 3, where the upper part of the housing is partially cut out.

By means of FIGS. 3 and 4, developments of an alternate air-conditioning system in accordance with the present invention are described in detail. In these figures, parts that are identical or similar to parts of the embodiment according to FIGS. 1 and 2 have the same reference numbers. Those parts having the same reference numbers, therefore, will not be described again in detail in the following.

The embodiment of the air-conditioning system shown in FIGS. 3 and 4 is designed in such a way that the circulating air drawn in via the circulating-air intake device 13 can be cooled, and is then, by means of the blower 7, delivered to the air diffuser 10 as cooled air. From the air diffuser 10, it is then, via the air-outlet nozzles 12, discharged into the interior of the driver's cab. In the case of this embodiment, instead of a covering cap 20 (see FIGS. 1 and 2), the closure part for receiving part 4 is a housing top part 21 that is placed on the receiving part 4 and is, preferably, detachably mounted to it, in which case the receiving part 4 will then form a bottom part 22 of a housing. The top part 21 of the housing is developed in the shape of an inverted trough arrangement, and is dimensioned and designed in such a way that it has a receiving space 23 for at least one evaporator 24.

The solid lines in FIGS. 3 and 4 show an evaporator block 25 arranged in a horizontal position and extending transversely to the longitudinal axis A—A of the vehicle. The evaporator block 25 is arranged above the circulating-air intake device 13, that is separated from the delivery side 9 of the blower 7 by wall 15, and protrudes partially into the bottom part 22 of the housing.

The broken lines in FIGS. 3 and 4 show an evaporator 24' that is formed by a large surface flat-type evaporator 26 arranged horizontally and in the upper part 21 of the housing above the blower 7.

Figure 5:
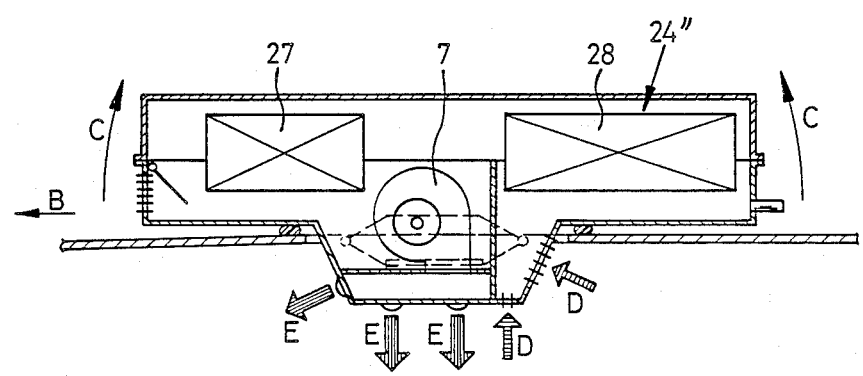
FIG. 5 is a lateral sectional view that is similar to FIG. 3 of another embodiment of an air-conditioning system.

As shown in FIG. 5, where another embodiment of the air-conditioning system is illustrated, with identical or similar parts having the same reference numbers as in the preceding embodiments, an evaporator 24" is provided that is comprised of two evaporator blocks 27 and 28. In this case, both evaporator blocks 27 and 28 are arranged horizontally, and each evaporator block 27, 28 is arranged on one side of the blower 7 in such a way that it protrudes into the bottom part 22 of the housing.

These developments of the evaporators 24, 24' and 24" show that the top part 21 of the housing is designed in such a way that, depending on the required or desired cooling capacity, a correspondingly suitable evaporator size can be housed without changing either the bottom part 22 or the top part 21 of the housing. Thus, the air-conditioning system can, at any time, be adapted to a desired capacity requirement. Naturally, combinations of the various developments are also possible for the arrangements of the evaporators 24, 24' and 24".

In the case of the air-conditioning system embodiment shown in FIGS. 3 to 5, a cooling of the air is provided by air being taken in via the circulating-air intake device 13, being passed through the evaporator 24 and being introduced into the air diffuser 10 by means of the blower 7, so that the now cooled air is directed back into the interior of the cab. Since bottom part 22 is the same as receiving part 4 of the embodiment according to FIGS. 1 and 2, a fresh-air inlet device 17 (that can be controlled by means of flap 19) is also provided so that, if necessary or desired, fresh air can also be mixed with the cooled air before the cooled air enters into the air diffuser 10. Likewise, when the evaporators 24, 24' and 24" are switched off, air may be supplied to the interior of the cab using 100% fresh air.

Additionally, the air-conditioning system permits a variable and comfortable ventilation operation for the interior of the driver's cab, when the vehicle is not moving and the engine is switched off, by enabling direct ventilation to be achieved by means of a displacement of the housing via the hinge mechanism 3 so that the fresh air enters the driver's cab directly via the roof opening 2. Thus, a supplying of fresh air into the driver's cab is also possible when the driver is sleeping in the parked vehicle.

In FIGS. 3 to 5, a water drip means 29 is provided, that is shown in diagram form at the bottom part 22 of the housing above the roof sheeting 1, for condensation water formed at the evaporators 24, 24' and 24" as well as connections 30 intended for cooling-medium hoses and similar devices for connection with other aggregates of the air-conditioning system, such as the condenser, etc. The condenser may be mounted at any suitable point at the vehicle and is not shown in the drawing. It may, for example, be mounted in front of the radiator of the vehicle or in the underfloor area or at the frame and possibly also in proximity of the wheel housing.

Figure 6:
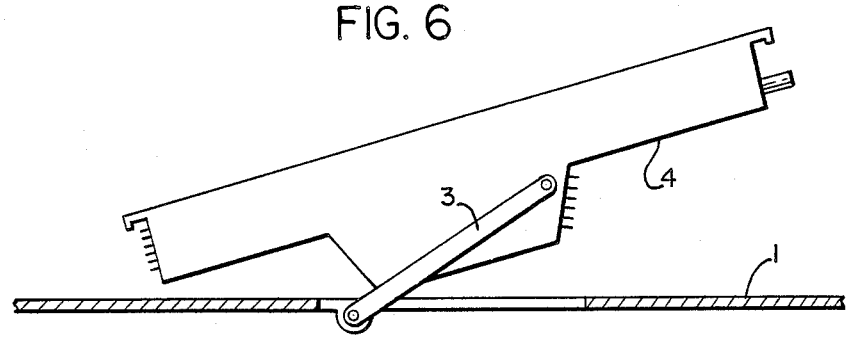
FIG. 6 is a diagrammatic view illustrating the air-conditioning system in the process of being lifted via a hinge mechanism to expose the roof opening.

In the figures of the drawing, the arrows C show the moving directions of the receiving part 4 with the mounted covering cap 20 (see FIG. 1 and 2) and of the overall housing consisting of the bottom part 22 and the top part 21 of the housing (see FIGS. 3 to 5). In particular, with a hinge mechanism as shown in the abovenoted U.S. Pat. No. 4,415,197, the whole unit can be raised and held above the roof opening in a plane parallel thereto or from that position the unit can be pivoted about the axis of its connector means in the direction of either arrow C so that the opening 2 is exposed only at its front or rear side, the underside of the receiving part 4/22 forming a scoop through which air is channeled into the opening or air is vented out through the opening, respectively, during forward driving movement of the vehicle. FIG. 6 illustrates the unit in the process of being pivoted to form a rearwardly opening scoop, by way of example. To secure the air-conditioning system in its illustrated position closing ventilation opening 2, it may also be provided with catch means constructed and arranged in a manner corresponding to like catch means on the hatch that it is being substituted for. Such catch means will then be matable with the existing hatch means on the opening of the ventilation device. The arrows D in the figures of the drawings show the circulating air taken in by the air-intake device 13, and the arrows E diagrammatically show the air delivered to the interior of the driver's cab via the air diffuser 10.

Instead of the evaporator block 27 in FIG. 5, a water heat exchanger may be provided by means of which the air, i.e., the cooled air and/or fresh air can also be heated and/or dried.

While I have shown and described plural embodiments in accordance with the present invention, it is understood that the same is not limited thereto, but is susceptible of numerous changes and modifications as known to those skilled in the art, and I, therefore, do not wish to be limited to cover all such changes and modifications as are encompassed by the scope of the appended claims.

I claim:

1. An air-conditioning system for retrofit installation in vehicles particularly those having a ventilation system with a roof opening, a hatch and a hinge assembly interconnected between the vehicle roof and the hatch for enabling the hatch to be movable between positions opening and closing the roof opening, the air-conditioning system comprising at least one blower, a receiving part within which the blower is mounted in a central area with a delivery side thereof in communication with air distribution means of the receiving part and wherein a circulating-air intake device in the receiving part is provided in a manner that is separated from the delivery side of the blower, said receiving part being constructed in a manner enabling direct substitution thereof for the hatch of the ventilation system without modification of the roof opening, the air-conditioning system, when installed in the vehicle, being hinged for movement, as a whole, between raised positions wherein the roof opening is at least partially exposed for direct ventilation of the vehicle interior and a lowered position closing the roof opening for treatment of air in the vehicle interior by the air-conditioning system.

2. An air-conditioning system according to claim 1, wherein the central area of the receiving part has a recessed bottom wall portion within which at least part of the blower and an air diffuser of the air distribution system means are situated and wherein the recessed bottom wall portion is sized to fit into the roof opening.

3. An air-conditioning system according to claim 2, wherein said recessed bottom wall portion has minimum dimensions of approximately 20 mm long by 30 cm wide.

4. An air-conditioning system according to claim 2, wherein the receiving part is formed of a keel-hulled boat shape in cross section and has sides that extend upwardly beyond the top of the blower, and wherein the recessed bottom wall portion forms the keel of the boat shape.

5. An air-conditioning system according to claim 1, wherein, at a side of the receiving part facing in a forward driving direction of the vehicle, a fresh-air inlet device is provided.

6. An air-conditioning system according to claim 5, wherein the fresh-air inlet device is provided with a flap for controlling the amount of fresh air entering via the fresh-air inlet device.

7. An air-conditioning system according to claim 2, wherein the air diffuser, in the position of the system closing the roof opening, has an air diffusion duct extending transversely to a longitudinal axis of the vehicle and air-outlet nozzles directed into the interior thereof.

8. An air-conditioning system according to claim 7, wherein a separating wall is provided for separating the delivery side of the blower from the circulating-air intake device.

9. An air-conditioning system according to claim 8, wherein the separating wall extends vertically and forms a limiting wall of the air diffusion duct.

10. An air-conditioning system according to claim 9, wherein the recessed bottom wall portion of the receiving part has a trapezoidal cross section, the shorter parallel side of which faces the interior of the cab.

11. An air-conditioning system according to claim 7, wherein the recessed bottom wall portion of the receiving part has a trapezoidal cross section, the shorter parallel side of which faces the interior of the cab.

12. An air-conditioning system according to claim 2, wherein a closure part is provided for closing the top side of the receiving part.

13. An air-conditioning system according to claim 12, wherein the closure part is a covering cap.

14. An air-conditioning system according to claim 12, wherein the receiving part forms a bottom part of a housing, and wherein the closure part is an inverted trough-shaped top part of the housing, the trough-shaped top part of the housing being mounted on the bottom part so as to form a receiving space for at least one evaporator.

15. An air-conditioning system according to claim 14, wherein, in the position where the system closes the roof opening, the evaporator is oriented horizontally and extends transversely relative to a longitudinal axis of the vehicle.

16. An air-conditioning system according to claim 15, wherein the evaporator is a flat-type evaporator extending in the receiving space of the top part of the housing above the blower.

17. An air-conditioning system according to claim 15, wherein at least one evaporator is a horizontally arranged evaporator block which, relative to a forward driving direction, is arranged behind the blower and protrudes partially into the bottom part of the housing.

18. An air-conditioning system according to claim 14, wherein, on opposite sides of the blower, an evaporator block is arranged horizontally, and wherein the two evaporator blocks are arranged in parallel to one another.

19. An air-conditioning system according to claim 12, wherein the receiving part and the closure part are detachably connected with one another.

20. An air-conditioning system according to claim 14, wherein at the bottom part of the housing above the roof sheeting, a water drip means and connection for cooling-medium pipes are provided.

21. An air-conditioning system according to claim 2, wherein a sealing means is provided at the bottom side of the receiving part for forming a sealed junction with the vehicle roof in the position of the system closing the roof opening.

22. An air-conditioning system according to claim 14, wherein a water heat exchanger is provided within the housing on an opposite side of the blower from the evaporator, the heat exchanger and evaporator being horizontally disposed in parallel with each other.

* * * * *